(12) United States Patent
Berry et al.

(10) Patent No.: US 8,011,235 B2
(45) Date of Patent: Sep. 6, 2011

(54) APPARATUS AND METHOD FOR MEASURING LOCAL TIRE STIFFNESS

(75) Inventors: Charles D. Berry, Akron, OH (US); Jacob R. Kidney, Wadsworth, OH (US); Jon I. Stuckey, Louisville, OH (US); H. James Sube, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 106 days.

(21) Appl. No.: 12/424,614

(22) Filed: Apr. 16, 2009

(65) Prior Publication Data

US 2010/0263440 A1    Oct. 21, 2010

(51) Int. Cl.
G01M 17/02    (2006.01)
(52) U.S. Cl. .......................................... 73/146
(58) Field of Classification Search .............. None
See application file for complete search history.

(56) References Cited

U.S. PATENT DOCUMENTS

| | | |
|---|---|---|
| 1,462,517 A | 7/1923 | Marquette |
| 1,915,963 A | 6/1933 | Walt |
| 2,484,620 A | 10/1949 | Glen |
| 2,563,787 A | 8/1951 | Keefe |
| 2,587,470 A | 2/1952 | Herzegh |
| 3,303,571 A | 2/1967 | Veafs |
| 3,644,047 A | 2/1972 | Brown et al. |
| 3,915,215 A | 10/1975 | Nebout |
| 4,015,652 A | 4/1977 | Harris |
| 4,158,567 A | 6/1979 | Honma et al. |
| 4,184,531 A | 1/1980 | Honigsbaum |
| 4,209,051 A | 6/1980 | Udall |
| 4,269,251 A | 5/1981 | Harrington et al. |
| 4,308,747 A | 1/1982 | Reed |
| 4,311,044 A | 1/1982 | Marshall et al. |
| 4,327,580 A | 5/1982 | Suzuki et al. |
| 4,402,218 A | 9/1983 | Engel |
| 4,414,843 A | 11/1983 | Kounkel et al. |
| 4,434,652 A | 3/1984 | Christie |
| 4,440,018 A | 4/1984 | Christie |
| 4,475,384 A | 10/1984 | Christie |
| 4,479,381 A | 10/1984 | Kounkel et al. |
| 4,783,992 A | 11/1988 | Ishibashi |
| 4,805,125 A | 2/1989 | Beebe |
| 4,805,682 A | 2/1989 | Griffiths et al. |
| 4,934,184 A | 6/1990 | Tsuji |
| 4,955,229 A | 9/1990 | Himmler |
| 4,967,822 A | 11/1990 | Frerichs et al. |
| 5,027,649 A | 7/1991 | Himmler |
| 5,044,413 A | 9/1991 | Noma et al. |
| 5,065,803 A | 11/1991 | Nakatani et al. |
| 5,145,536 A | 9/1992 | Noma et al. |
| 5,297,606 A | 3/1994 | Pompier et al. |
| 5,313,827 A | 5/1994 | Yovichin |
| 5,365,781 A | 11/1994 | Rhyne |
| 5,421,197 A | 6/1995 | Ohms |
| 5,610,329 A | 3/1997 | Yovichin et al. |
| 5,616,839 A * | 4/1997 | Chen et al. ................ 73/146 |

(Continued)

Primary Examiner — Andre Allen

(57) ABSTRACT

A tire testing apparatus and method for measuring the local stiffness of a tire. The apparatus includes a force producing mechanism, a force measuring device, a force transmitting member, and a measuring device. The force transmitting member applies a force to a tire surface and the measuring device measures the distance of the displacement of the tire surface caused by the force. A tire testing method comprising mounting a tire on a tire testing apparatus to measure a local stiffness of the tire. The method further comprises inflating the tire, applying a force to a local area of the tire, monitoring the force, measuring a distance corresponding to the local deflection, and calculating a local stiffness.

20 Claims, 7 Drawing Sheets

U.S. PATENT DOCUMENTS

| | | |
|---|---|---|
| 5,769,981 A | 6/1998 | Turley et al. |
| 6,065,331 A | 5/2000 | Fukasawa |
| 6,067,848 A | 5/2000 | Siegfried et al. |
| 6,539,789 B1 | 4/2003 | Kostka et al. |
| 6,640,857 B2 | 11/2003 | Ikeda |
| 6,779,391 B2 | 8/2004 | Bsl |
| 6,837,101 B2 * | 1/2005 | Unseld .............................. 73/146 |
| 6,886,617 B2 | 5/2005 | Eynard et al. |
| 6,929,046 B1 | 8/2005 | Fontaine et al. |
| 7,040,026 B2 | 5/2006 | Hirano et al. |
| 7,055,379 B2 | 6/2006 | Rothamel |
| 7,088,442 B2 | 8/2006 | Hassler et al. |
| 2002/0011103 A1 * | 1/2002 | Kimbara et al. ................ 73/146 |
| 2002/0177959 A1 * | 11/2002 | Williams et al. ................ 702/41 |
| 2002/0177964 A1 * | 11/2002 | Shteinhauz ...................... 702/75 |
| 2003/0041946 A1 * | 3/2003 | Fogal, Sr. ........................ 156/75 |
| 2006/0272408 A1 * | 12/2006 | Matsumoto ...................... 73/462 |
| 2009/0000371 A1 * | 1/2009 | Hanada ........................... 73/146 |

\* cited by examiner

APPARATUS AND METHOD FOR MEASURING LOCAL TIRE STIFFNESS

FIELD OF INVENTION

The claimed invention is directed to an apparatus and method to measure tire stiffness. More particularly, the claimed invention is directed to an apparatus and method to measure local tire stiffness such as can be caused by variations in tire construction.

BACKGROUND

Tire manufacturers have used global run out probes or global non-contact lasers to measure global tire surface topography in order to sort or grade tires. For example, global tire surface topography compares an entire sidewall or an entire tread of a test tire to a computer model and provides an acceptable or unacceptable rating for the test tire. However, global tire surface topography techniques are not suitable to identify more discrete or local tire stiffnesses. Variations that occur between tire layers, between carcass or reinforcement ply cords, or within other tire components can produce local stiffness variations in body ply force from one location to another or between one cord to another along the sidewall or other surface of a tire. With variations, as well as certain others, global tire surface topography techniques are not suitable.

SUMMARY

A tire testing apparatus and method for measuring the local stiffness of a tire. The apparatus includes a force producing mechanism, a force measuring device, a force transmitting member, and a measuring device. The force transmitting member applies a force to a tire surface and the measuring device measures the distance of the displacement of the tire surface caused by the force. A tire testing method comprising mounting a tire on a tire testing apparatus to measure a local stiffness of the tire. The method further comprises inflating the tire, applying a force to a local area of the tire, monitoring the force, measuring a distance corresponding to the local deflection, and calculating a local stiffness.

BRIEF DESCRIPTION OF THE DRAWINGS

In the accompanying drawings, embodiments of an apparatus and method for measuring local tire stiffness are illustrated that, together with the detailed description provided below, describe exemplary embodiments of the apparatus and method. It will be appreciated that the illustrated boundaries of elements in the drawings represent one example of the boundaries. One of ordinary skill in the art will appreciate that one element or step may be designed as multiple elements or steps or that multiple elements or steps may be designed as a single element or step. An element shown as an internal component of another element may be implemented as an external component and vice-versa.

Further, in the accompanying drawings and description that follow, like parts are indicated throughout the drawings and description with the same reference numerals, respectively. The figures are not drawn to scale and the proportions of certain parts have been exaggerated for convenience of illustration or to enhance understanding.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Bead" refers to the part of the tire that contacts the wheel and defines a boundary of the sidewall.

"Body ply force" refers to the tensile force in the tire cords and various tire component layers that are part of the carcass ply, reinforcement ply, circumferential belt, tread, shoulders, sidewalls, bead portions of a tire, or the like, due to expansion of an uncured tire into a tire mold during curing and due to inflation pressure when a tire and wheel assembly is inflated.

"Circumferential" and "circumferentially" refer to a direction extending along the perimeter of the surface of the annular tread perpendicular to the axial direction.

"Equatorial plane" refers to the plane that is perpendicular to the tire's axis of rotation and passes through the center of the tire's tread.

"Lateral" refers to a direction along the tread of the tire going from one sidewall of a tire to the other sidewall, wherein the direction is parallel with the axis of rotation.

"Radial" and "radially" refer to a direction perpendicular to the axis of rotation of a tire.

"Sidewall" refers to that portion of the tire between the tread and the bead.

"Shoulder region" refers to the upper portion of each sidewall just below the edge of the tread.

"Tread" refers to that portion of the tire that comes into contact with the road under normal inflation and load.

Figure 1:
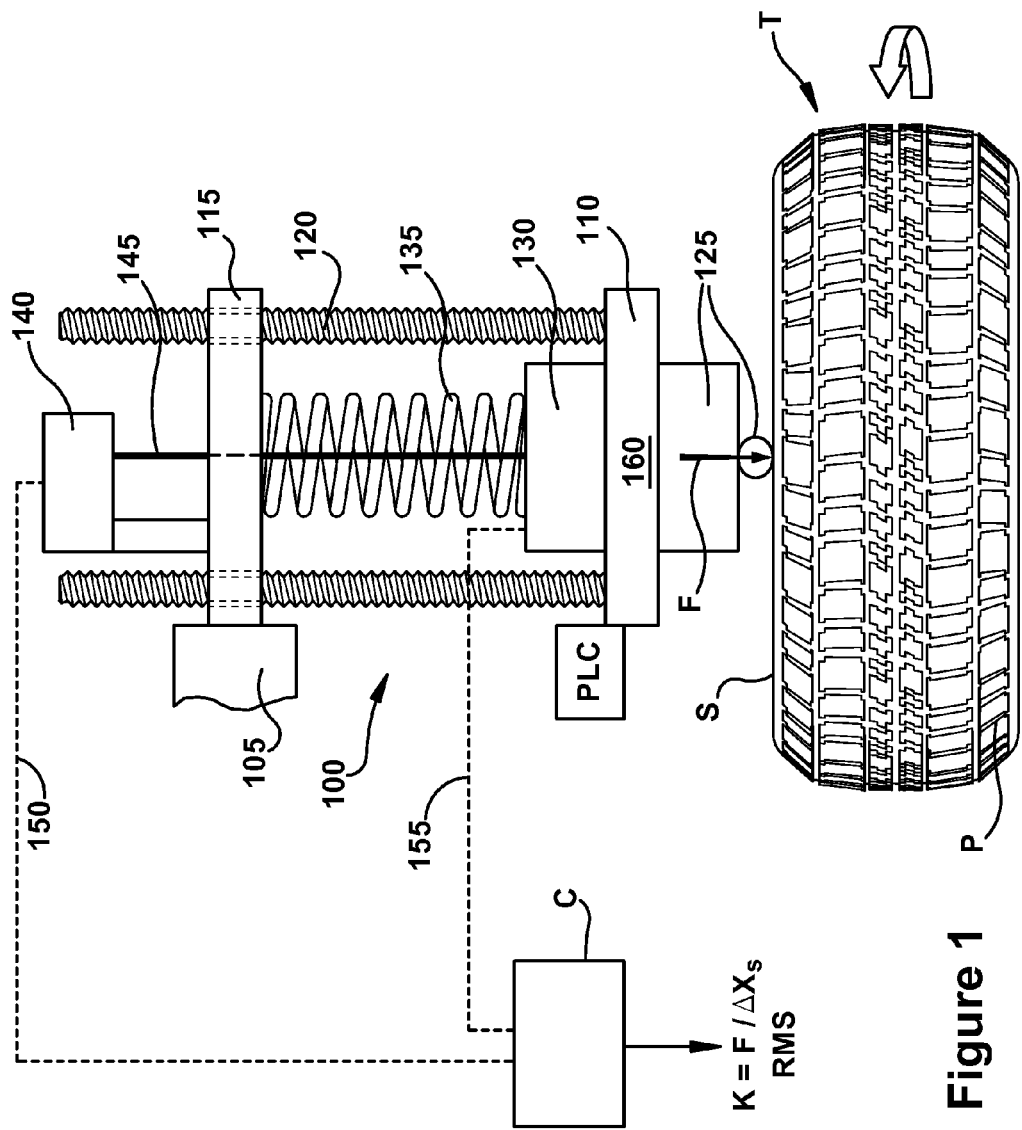
FIG. 1 illustrates a side view of a local stiffness measuring apparatus 100 and a tire T.

The inventors have discovered or disclosed herein an apparatus and method that measures local stiffness in a tire. FIG. 1 illustrates an exemplary local stiffness measuring apparatus 100, connected to a computer system C, for testing the local stiffness in a tire T with a sidewall S. The apparatus measures local stiffness about the peripheral surfaces or inner surfaces of a tire T, e.g., an internal or external portion of a sidewall or a tread. The local stiffness measuring apparatus 100 connects at member 105 to a tire testing machine (not shown) that enables inflation of tire T to a specified pressure P and rotates the tire T at various speeds.

In the illustrated embodiment of FIG. 1, local stiffness measuring apparatus 100 includes a steel support structure comprising a lower plate 110, an upper plate 115, and connecting rods 120 that move freely through upper plate 115 as the tire deflects. In addition, local stiffness measuring apparatus 100 includes a contact probe 125, a load cell 130, a spring 135, and a linear measurement device 140. In an alternative embodiment (not shown), local stiffness measuring apparatus 100 further includes a wire 145 that attaches to the lower plate 110. In yet another alternative embodiment (not shown), local stiffness measuring apparatus 100 includes linear measurement device 140 that comprises a laser that measures distance. In another alternative embodiment (not shown), the local stiffness measuring apparatus 100 comprises a contact probe 125, a load cell 130, a spring 135, and a linear measurement device 140.

In operation, the tire T is connected to a tire testing machine (not shown) and the contact probe 125 (e.g., a roller bearing) transfers a force F from the spring 135 to the sidewall S of the tire T as the load cell 130 measures the force F. The contact probe 125 can comprise a stationary end or a rotating end, such as a track wheel or wheel bearing, so the tire is not damaged as the apparatus 100 measures the tire. Force F is oriented in a direction perpendicular to the radial direction of the tire. Alternatively, the contact probe 125 of the local stiffness measuring apparatus 100 can be positioned such that the force on the tire is in a radial direction, a normal direction, a direction that is normal to the sidewall contact location of the contact prove, or some other direction relative to the sidewall of the tire.

In order to measure variation in tire stiffness $K_t$, the force F applied to the tire T is a substantially constant force and measured by load cell 130, shown in FIG. 1. The force F is set to a constant force by compressing spring 135 by an initial deflection $X_o$ of the spring, where spring 135 has a spring constant $K_s$ and force F is equal to the initial deflection $X_o$ times the spring constant $K_s$. Spring 135 is illustrated as a single helical spring, but could be substituted with two or more helical springs. In other embodiments (not shown), as one skilled in the art would know, spring 135 could be replaced by at least one of the following devices: a coil spring, a conical spring, a Belleville spring, a gas spring, an air cylinder, a block of known weight, and similar devices that can apply a substantially constant force. Alternatively, the force applied can vary wherein the force-deflection curve is known for the spring and the varying force and deflection are recorded by the computer system C as the tire rotates.

With continued reference to FIG. 1, force F produces a localized deflection $X_t$ on sidewall S of tire T. Linear measurement device 140 measures a change in deflection of the spring $\Delta X_s$ that corresponds to the localized deflection $X_t$ on sidewall S under force F at discrete positions by continuously measuring the linear movement of wire 145 connected to spring 135 as the tire rotates. As sidewall S deflects under the force F, the spring 135 compresses or expands and linear measurement device 140 measures the linear distance that the wire 145 moves, which is substantially similar to the localized deflection $X_t$. The linear measurement device 140 may be a distance measuring device, a string pot linear measuring device, a linear variable displacement transducer, or the like.

Further, in the illustrated embodiment, the force F measured by load cell 130 and localized deflection $X_t$ of rotating tire T measured by linear measurement device 140 are sent to the computer system C that calculates and records the local stiffness $K_t$. Load cell 130 and linear measurement device 140 send measurements (e.g., force, deflection, and location) to computer system C while the tire rotates. The measurements are sent by at least one of the following data transmission techniques: hard wire transmission, wireless transmission, and the like (data transmission is represented by the dashed lines 150, 155 in FIG. 1). Alternatively, the measurements from the load cell 130 and the linear measurement device 140 are sent to the computer system C at the end of the test in a batch transmission mode. If the hard wire transmission technique is selected, then dashed lines 150 and 155 in FIG. 1 represent wires that the data is sent through to computer system C. Unless specifically stated otherwise, it is appreciated that throughout this detailed description, terms like computer system, computer, processing, computing, calculating, determining, displaying, or the like, refer to physical components, actions, and processes of a computer system, logic, processor, hardware and/or software, or a similar electronic device that manipulates and transforms data represented as physical (electronic) quantities.

In other embodiments (not shown), the local stiffness measuring apparatus 100 includes member 105 that does not connect to a tire testing machine, but attaches to at least one weight bearing device. Suitable weight bearing devices include, but are not limited to, a support stand that mounts to a floor, a wall, a ceiling, a structural beam, and other building structural components. In yet other embodiments (not shown), local stiffness measuring apparatus 100 can be configured to rotate at various speeds about a fixed structural support while the tire T is stationary and connected to a tire testing machine. In still other embodiments (not shown), local stiffness measuring apparatus 100 and the tire T can be configured to both rotate relative to a fixed structural support. In other embodiments (not shown), local stiffness measuring apparatus 100 or tire T can be configured horizontally, vertically, or at any angle relative to a fixed structural support. In addition, it should be understood that the local stiffness measuring apparatus 100 may include more or less structural components than what is shown in the illustrated embodiment.

Further, local stiffness measuring apparatus 100 may include a programmable logic controller PLC, computer control unit, or the like. In another embodiment, a control system may be at least one of the following: a computer, a programmable logic controller, a computer control unit, or the like. The control system or the programmable logic controller can store the measurements of the load cell 130, the linear measurement device 140, and the coordinates of the tire (X, Y, and Z coordinates) and then calculate and record the tire's local stiffness $K_t$ as the tire testing machine rotates the tire. In yet other embodiments (not shown), programmable logic controller PLC or the like records and calculates various parameters, including: deflection, root mean square of variance for deflection, stiffness, stiffness variance, position coordinates, or other testing and statistical parameters. In other embodiments (not shown), programmable logic controller PLC can be programmed to rotate the tire or the tire testing machine and then record tire coordinates and measurements of the tire's local stiffness variation $K_t$ at a specific location or range of locations specified in a coordinate system with X, Y, and Z coordinates, degrees of rotation, force, deflection, change in force, change in deflection, change in stiffness, or the like. In yet other embodiments (not shown), programmable logic controller PLC or the like can be programmed to calculate the local stiffness variation for a tire at a user specified or preprogrammed radial, lateral, or circumferential position relative to the tire's center of rotation, axis of rotation, equatorial plane, or the like.

In other embodiments, contact probe 125 of the local stiffness measuring apparatus 100 can be arranged to make contact with any of the peripheral surfaces, inner surfaces, or confine surfaces of the tire T, including at least one of the following: a bead region, a sidewall, a shoulder, a tread, an internal wall beneath the tread, an internal sidewall or shoulder, and the like. If a tire designer desires to measure an inner surface or confine surface of the tire T, then the tire T is not installed and inflated on the tire testing machine, but is held on its peripheral surface by a tire fixture (not shown) to allow access for the local stiffness measuring device 100. In yet other embodiments (not shown), contact probe 125 may be any rolling, load bearing device that allows movement between a moving surface (of the tire) and itself, including at least one of the following: at least one roller pin, at least two roller bearings, and the like.

In an alternative embodiment (not shown), the local stiffness measuring apparatus 100 further includes a marking apparatus and system 160 that can mark a tire location according to a user specified parameter, e.g., stiffness that is outside a specified acceptable range. The marking system 160 can use at least one of the following marking materials: chalk, adhesive tape, paint, ink, dye, removable sticker, and the like. Further, the marking system 160 can apply to the tire T various marks in different shapes, or lines, and in various colors depending on the user specified parameter (e.g., a yellow dot can represent a portion of the tire that is below a user specified stiffness and a red dot can represent a portion of the tire that is above a user specified stiffness). In an alternative embodiment (not shown), the marking system 160 can apply to the tire T various marks that are removable or non-removable from the tire.

Figure 2:
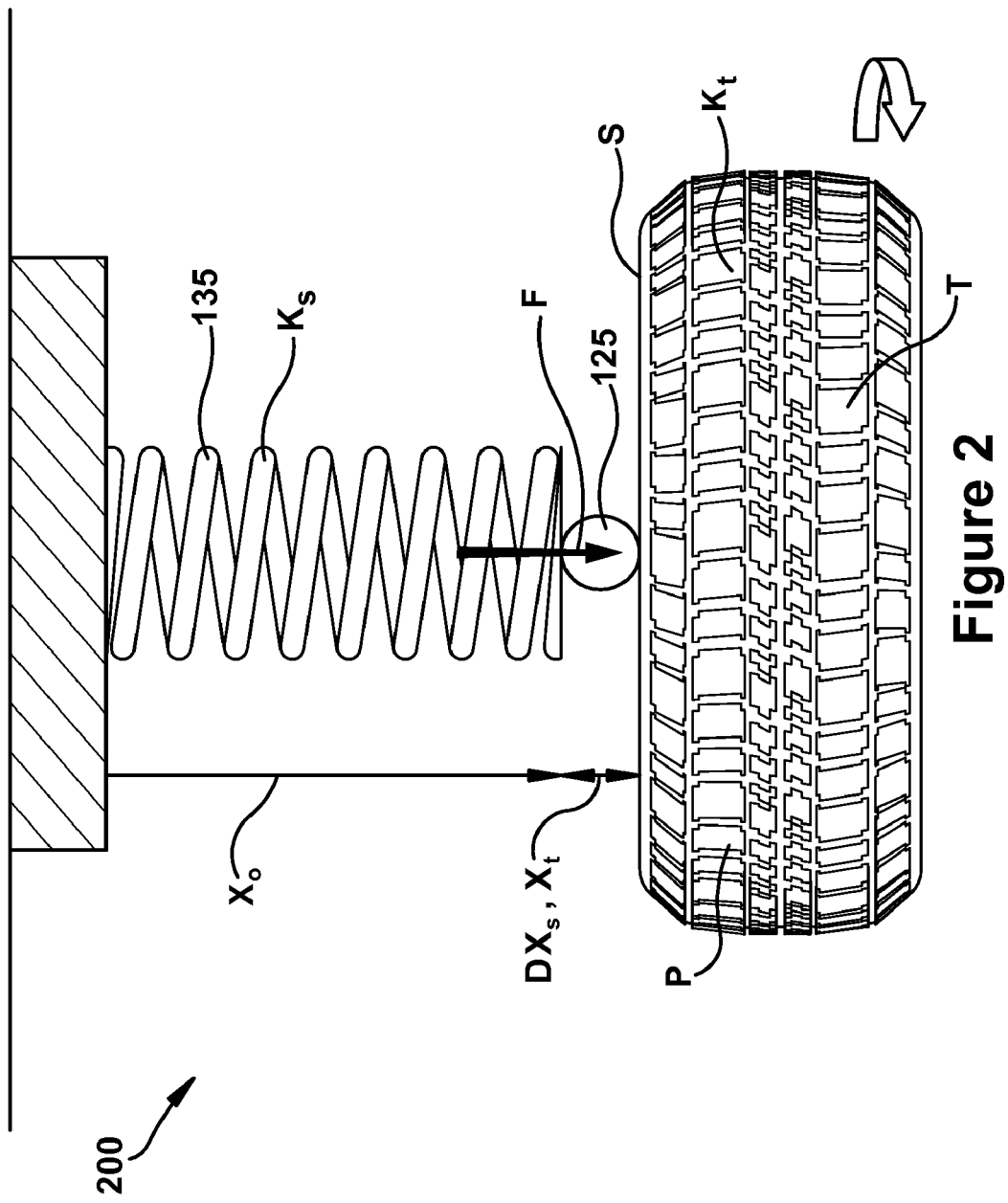
FIG. 2 illustrates a schematic 200 of the local stiffness measuring apparatus 100 and tire T, shown in FIG. 1, and various tire stiffness related parameters.

FIG. 2 shows a schematic diagram of portions of the apparatus 200 together with tire T and factors that determine local tire stiffness. The schematic depicts the tire T with a sidewall S that is at a pressure P and further illustrates related forces, distances, and spring constants for the tire T and the local stiffness measuring apparatus 100. In the illustrated embodiment, the spring 135, which has a spring constant $K_s$ and an initial deflection $X_o$, produces a constant force F against the contact probe 125 that then transfers this force to sidewall S as tire T is rotated by the tire machine (not shown). If the stiffness varies about the sidewall's periphery, then the deflection $X_t$ of the tire T varies. The tire stiffness $K_t$ is inversely proportional to the tire's deflection $X_t$, i.e., $K_t=F/X_t$. As discussed above, the force F can be applied to various peripheral portions and inner portions of the tire T to determine the local tire stiffness $K_t$ in different locations.

Figure 3:
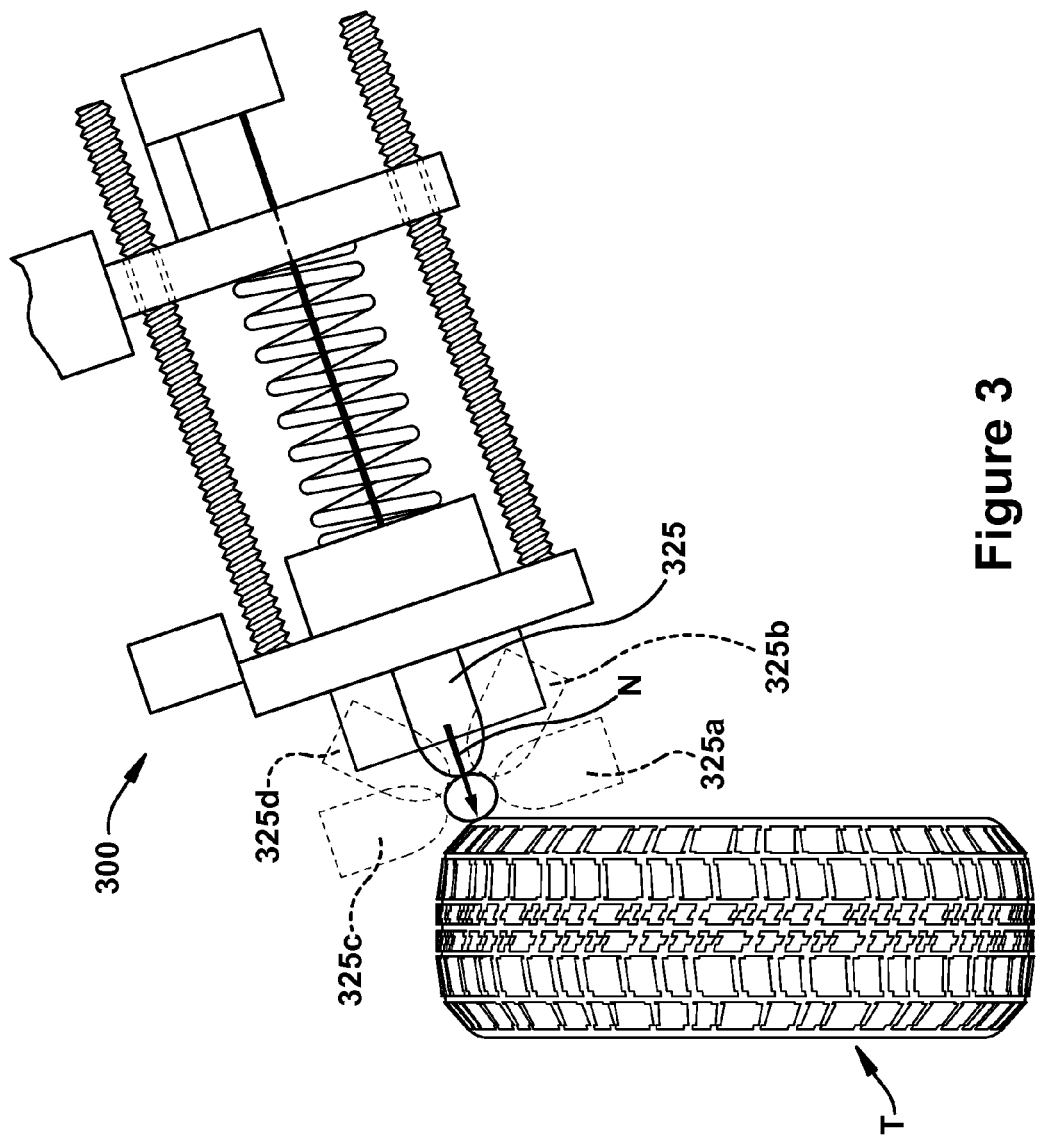
FIG. 3 illustrates a side view of another exemplary local stiffness measuring apparatus 300 and a tire T.

FIG. 3 illustrates a side view of another exemplary local stiffness measuring apparatus 300 and a tire T. The local stiffness measuring apparatus 300 is substantially the same as the local stiffness measuring apparatus 100 of FIG. 1, except the local stiffness measuring apparatus 300 includes a contact probe 325 that is at a position that is normal to the sidewall contact location of the contact probe. Alternatively (as illustrated in dashed lines), the local stiffness measuring apparatus 300 includes a contact probe 325a-d that can be positioned so the force on the tire is in a radial direction, a normal direction, a direction that is normal to the sidewall contact location of the contact prove, a lateral direction, or some other direction relative to the sidewall of the tire. In another embodiment (not shown), the contact probe 325 of the local stiffness measuring apparatus 300 is positioned such that the force on the tire is at an angle, relative to a normal N direction relative to the sidewall contact location of the contact probe, from about minus ninety degrees to about ninety degrees. In yet another embodiment (not shown), the contact probe 325 of the local stiffness measuring apparatus 300 is positioned from about a substantially radial angle to about a substantially lateral angle.

Figure 4:
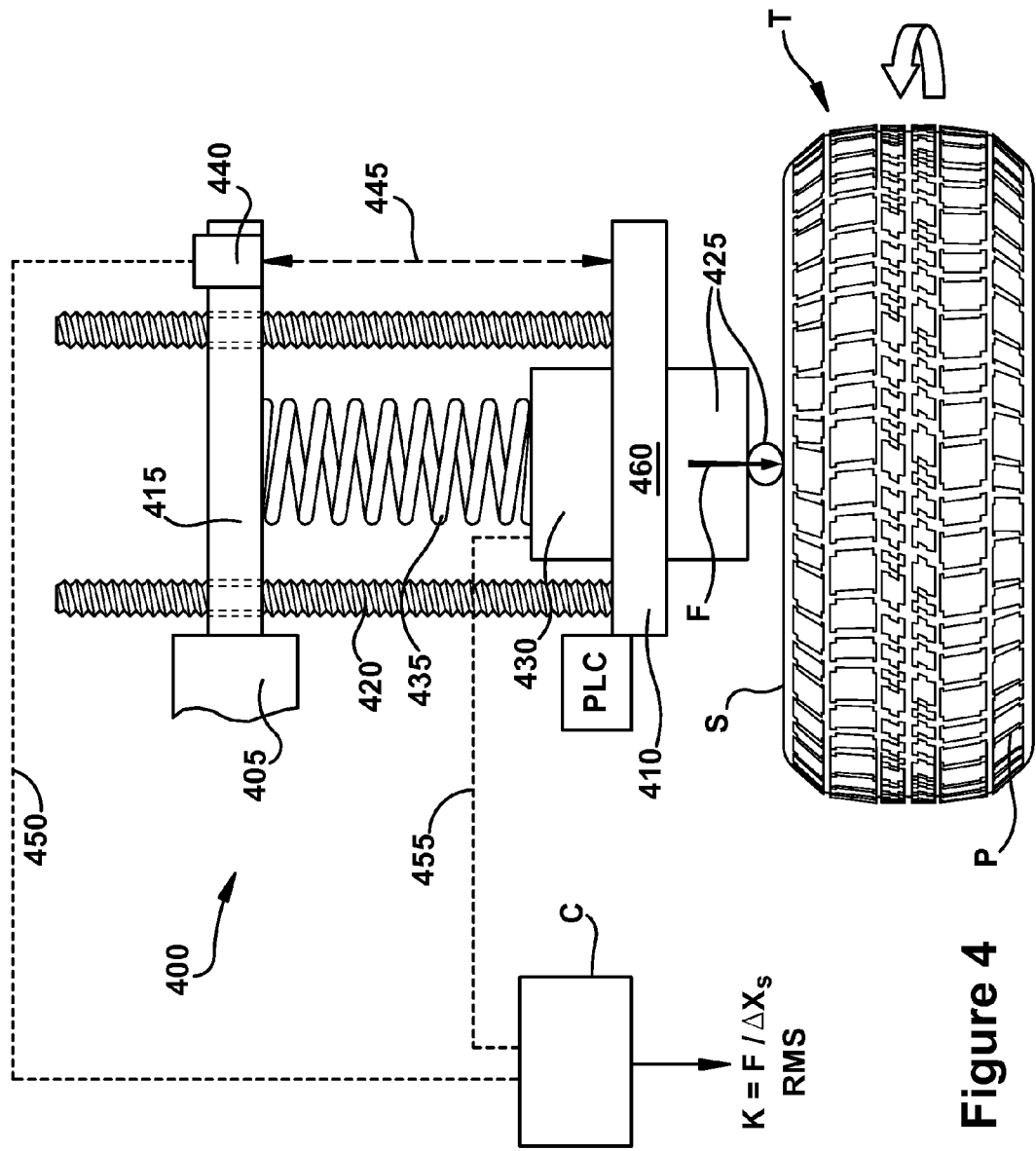
FIG. 4 is a side view of another exemplary local stiffness measuring apparatus 400 and a tire T.

FIG. 4 is a side view of another exemplary local stiffness measuring apparatus 400 and a tire T. The local stiffness measuring apparatus 400 is substantially the same as the local stiffness measuring apparatus 100 of FIG. 1 and the local stiffness measuring apparatus 300 of FIG. 3, except the linear measurement device 140 and the wire 145 are replaced with a linear measurement device 440 that comprises a laser linear measurement device. The linear measurement device 440 emits a laser, represented by a dashed line 445, to measure the distance between the linear measurement device 440 and a lower plate 460. In an alternative embodiment (not shown), linear measurement device 440 may be mounted on the lower plate 410 and measure the distance between the linear measurement device 440 and an upper plate 415.

Figure 5:
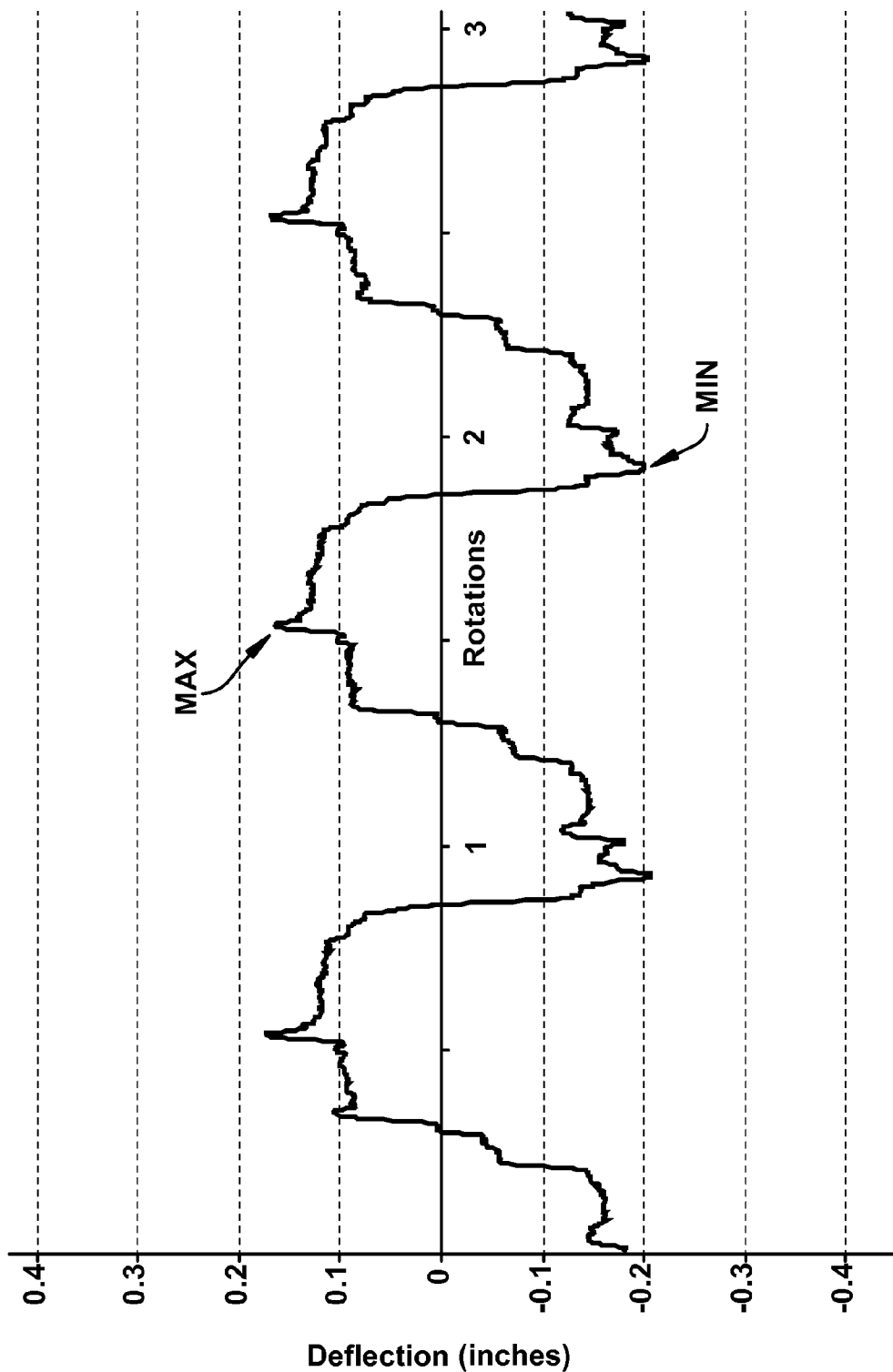
FIG. 5 is a graph of the local deflection for the tire T.

FIG. 5 shows a test graph of deflection of a sidewall S of a tire T connected to a local stiffness measuring apparatus. As shown in the graph, a repeating pattern forms with a maximum deflection MAX and a minimum deflection MIN. The graph illustrates that the tire T has about a 0.18 inch maximum deflection MAX at a sidewall location just beyond a half rotation and about a −0.20 inch minimum deflection MIN at a sidewall location just before a full rotation. Tire designers can use a graph of this type to determine an average deflection for a tire or to determine where a tire defect may exist. Further, tire designers can use this graph to evaluate tire designs and to evaluate manufacturing variability relative to a target tire design or relative to other manufactured tires. In addition, tire manufacturing facilities can measure a large population of tires and use statistical tools to sort, grade, group, or classify tires based on local stiffness measurements.

Figure 6:
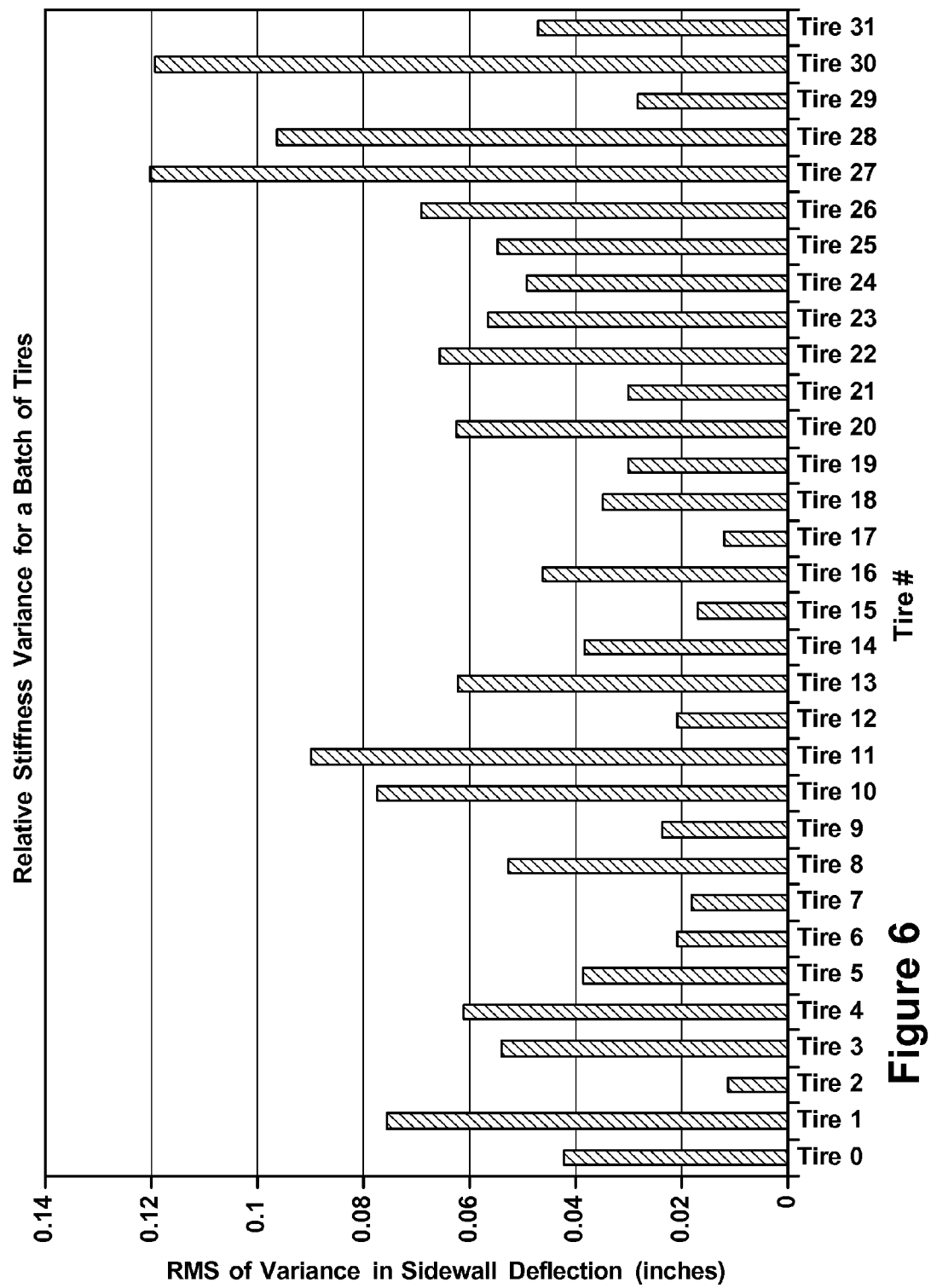
FIG. 6 illustrates a graph of the root mean square or RMS of variation in tire deflection for tires tested with the local stiffness measuring apparatus 100 of FIG. 1.

FIG. 6 shows an exemplary graph of root mean square of variation ("RMS") in tire deflection for a batch of thirty-one tires tested (tire nos. 1-31 listed along the horizontal-axis of the graph) with the local stiffness measuring apparatus 100, shown in FIG. 1. The tires in the graph are P225/60R15 tires having a maximum allowable inflation of 35 psi and a maximum allowable load of 1521 lbs that were inflated to 15 psi and loaded with 23 lbs of static load against the sidewall. For the thirty-one tires in the graph, the RMS in tire deflection varies from about 0.01 inch to about 0.12 inch. Twenty-eight tires have a RMS in tire deflection of about 0.09 inch or less, twenty-seven tires have a RMS in tire deflection of about 0.08 inch or less, twenty-five tires have a RMS in tire deflection of about 0.07 inch or less, twenty-one tires have a RMS in tire deflection of about 0.06 inch or less, and sixteen tires have a RMS in tire deflection of about 0.05 inch or less.

Tire manufacturers can use the RMS in tire deflection to grade tires, sort tires, group tires, or the like. For example, without limiting the scope of the invention, tire nos. 2, 7, 15, and 17 may be graded as an "acceptable" class of tires since the tires have a RMS in tire deflection less than 0.02 inch. Conversely, tire nos. 11, 27, 28 and 30 may be graded as a "non-acceptable" class since the tires have a RMS in tire deflection greater than 0.08 inch. Tire manufacturers may use the RMS in tire deflection as a manufacturing in-line or off-line testing technique and can develop varying acceptable and unacceptable standards.

Figure 7:
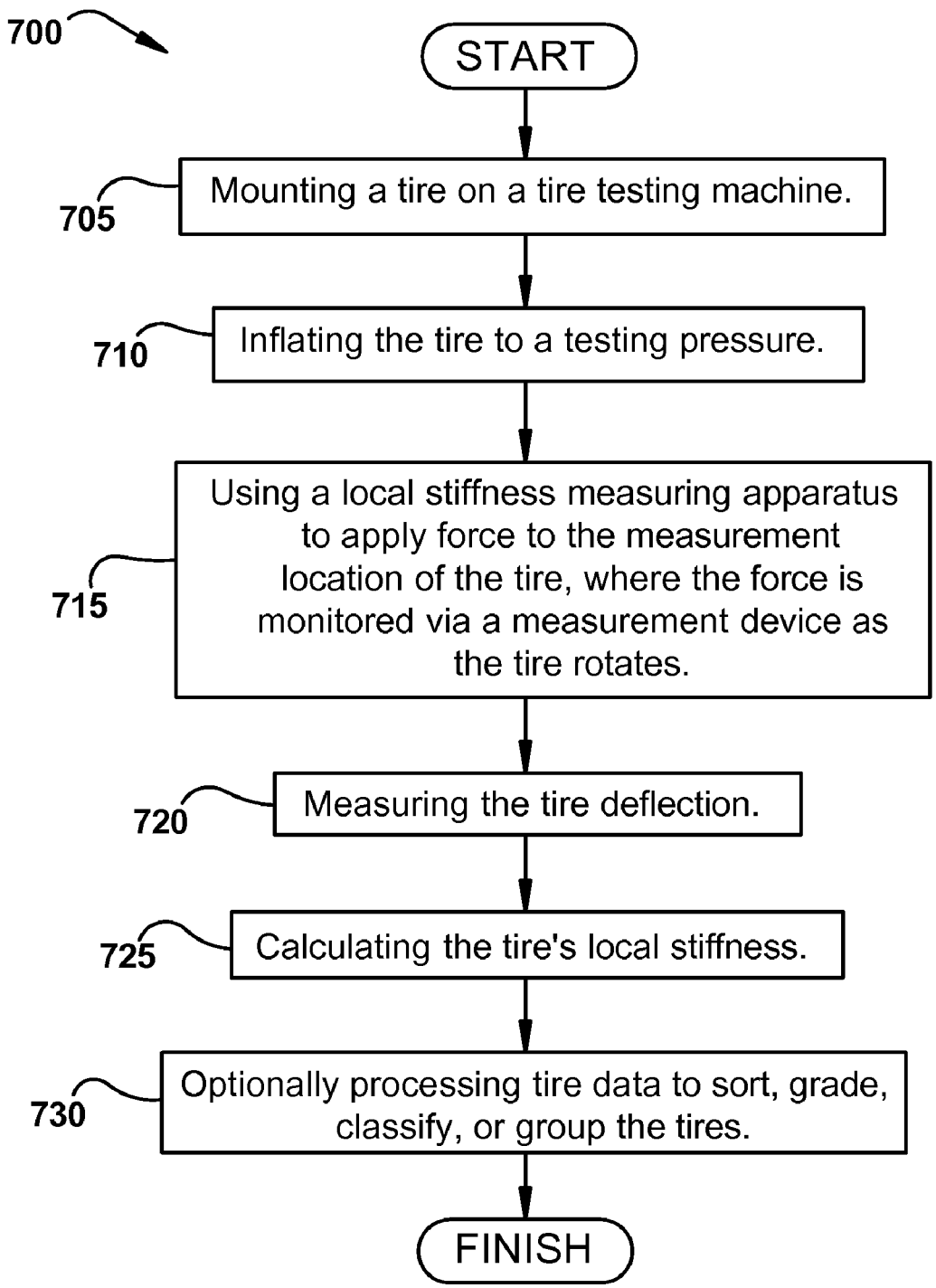
FIG. 7 illustrates a flow chart of one embodiment of a method to determine local tire stiffness 700.

FIG. 7 illustrates steps of a method 700 for measuring local tire stiffness. A tire is mounted on a tire testing machine at 705 and the tire testing machine inflates the tire to a testing pressure at 710. After the tire is mounted and inflated, then the local stiffness measuring apparatus applies a force to the rotating tire. The force is monitored by a measurement device at 715 while a linear measuring device simultaneously or substantially simultaneously measures a distance corresponding to the deflection of the tire at the location of the applied force at 720. During and after the tire test, the local tire stiffness is calculated at 725. Optionally, further processing can be completed to sort, grade, classify, or group the tires at 730. In an alternative embodiment (not shown), the method 700 can be modified to further include calculations of peak to peak differences, minimum to maximum differences, Fourier analysis, signal analysis, harmonic analysis, or the like. In yet another alternative method (not shown), the method 700 can be modified to further include a marking step where the tire is marked in at least one portion where the local stiffness of the tire satisfies at a pre-selected condition such as: exceeds a maximum stiffness, does not meet a minimum stiffness, falls within a user defined stiffness range, and the like. The marking step may occur during or after any of the previously mentioned method steps.

While various embodiments of the claimed invention are discussed and illustrated, and while these embodiments have been described in some detail, it is not the intention of the applicant to restrict or in any way limit the scope of the appended claims to embodiments. Moreover, advantages and modifications other than those identified above will appear to those skilled in the art. Accordingly, other undisclosed embodiments that fall within the scope of the appended claims, either literally or equivalently, are hereby reserved.

What is claimed is:

1. A tire testing apparatus for measuring the local stiffness of a tire, the apparatus comprising:
a force producing mechanism;
a force measuring device associated with the force producing mechanism;
a force transmitting member adapted to apply a force to a non-road-contacting tire surface;
a measuring device adapted to measure a distance corresponding to a displacement of the non-road-contacting tire surface produced by the force; and
a structure that supports the force producing mechanism, the force measuring device, and the force transmitting member.

2. A tire testing apparatus for measuring the local stiffness of a tire, the apparatus comprising:
a force producing mechanism;
a force measuring device associated with the force producing mechanism;
a force transmitting member adapted to apply a force to a tire surface at a plurality of angles, through a range of at least 30 degrees; and
a measuring device adapted to measure a distance corresponding to a displacement of the tire surface produced by the force.

3. The apparatus of claim 2, wherein the force transmitting member comprises a roller bearing.

4. The apparatus of claim 2, wherein the force producing mechanism comprises one or more springs, an adjustable known weight, a gas spring, an air cylinder, or a combination thereof.

5. The apparatus of claim 2, further comprising a connecting device which connects the force producing mechanism to the measuring device.

6. The apparatus of claim 2, wherein the measuring device comprises a linear measurement device.

7. The apparatus of claim 2, further comprising a computer or a programmable logic controller adapted to receive data from the force measuring device or from the device adapted to measure the distance.

8. The apparatus of claim 7, wherein the computer or the programmable logic controller receives data, wherein the data includes at least one of the following measurements: a force, a deflection, coordinates of the tire, degree of rotation of the tire, a radial position of the probe, and a probe orientation.

9. A testing apparatus for measuring the local stiffness of a tire, the apparatus comprising:
a force producing mechanism;
a force measuring device associated with the force producing mechanism;
a force transmitting member adapted to apply a force to at least one of: a tire bead region, sidewall, shoulder, internal wall beneath a tread, and internal sidewall; and
a measuring device adapted to measure a distance corresponding to a displacement of the tire surface produced by the force.

10. The apparatus of claim 9, wherein the force transmitting member comprises a roller pin.

11. The apparatus of claim 9, wherein the apparatus further measures at least one of the following: a force, tire coordinates, a rotational position of the tire, degree of rotation of the tire, a radial position of the probe, and a probe orientation.

12. A tire testing method, the method comprising:
mounting a tire to a tire testing machine and a tire testing apparatus for measuring a local stiffness of the tire;
inflating the tire to a testing pressure;
applying a force to a local area of the tire using the tire testing apparatus, monitoring the force while rotating the tire relative to the tire testing apparatus;
measuring a distance corresponding to the local deflection of the tire; and
calculating a local stiffness of the tire.

13. The tire testing method of claim 12, wherein measuring the local deflection of the tire includes contacting a sidewall of the tire.

14. The tire testing method of claim 13, further including processing a calculated local stiffness of the tire to sort, grade, group, or classify the tire.

15. The tire testing method of claim 13, further including marking the tire in at least one portion of the tire to indicated when the local stiffness of the tire is outside of design specifications.

16. The tire testing method of claim 13, further including marking the tire in at least one portion of the tire to indicate when the local stiffness of the tire is within a user defined stiffness range.

17. The tire testing method of claim 13, further including marking the tire in at least one portion of the tire with paint, chalk, ink, dye, or a removable sticker.

18. The apparatus of claim 1, wherein the force transmitting member is adapted to apply a force at a plurality of angles, through a range of at least 30 degrees.

19. The apparatus of claim 2, wherein the force transmitting member is adapted to apply a force to a tire surface at a plurality of angles, from about −90 degrees to about 90 degrees.

20. The apparatus of claim 9, wherein the force transmitting member is adapted to apply a force at a plurality of angles, through a range of at least 30 degrees.

* * * * *